May 8, 1928.
W. J. SCHLACKS
1,668,822
LOCOMOTIVE PISTON RING
Original Filed Jan. 5, 1921
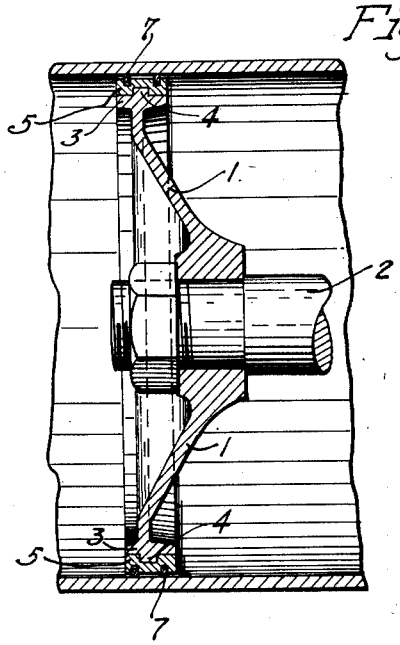
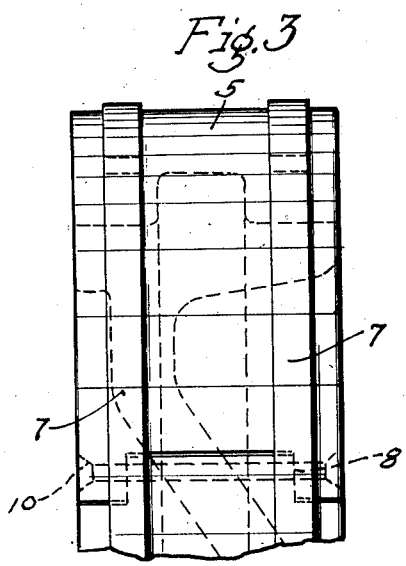
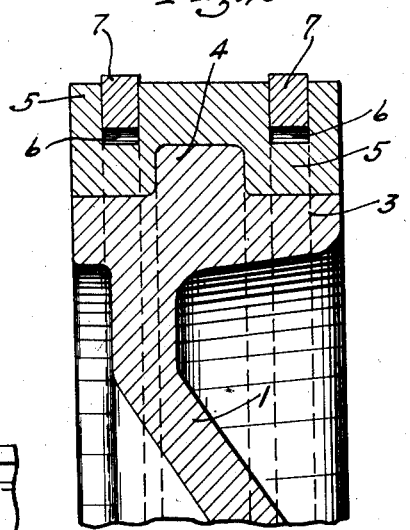
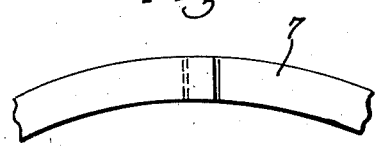
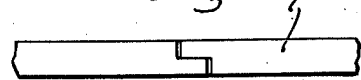
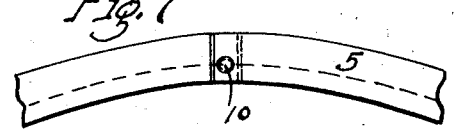
INVENTOR
William J. Schlacks
BY HIS ATTORNEY
James F. Williamson Patented May 8, 1928.

1,668,822

UNITED STATES PATENT OFFICE.

WILLIAM J. SCHLACKS, OF CHICAGO, ILLINOIS.

LOCOMOTIVE PISTON RING.

Application filed January 5, 1921, Serial No. 435,244. Renewed September 26, 1927.

This invention relates to locomotive piston rings and particularly to the device commonly known as a bull ring. As is well known to those skilled in the art, this ring is usually made of cast iron and travels in contact with the walls of the cast iron cylinder bushing. The piston head or spider casing carrying the bull ring is usually made of cast steel. The bull ring must be, therefore, made separately and secured to the spider. It is the common practice to secure the ring to the spider by contacting flanges on the two members through which pass a large number of rivets. When it is desired to remove or replace the bull ring, the rivets must be cut off and the new bull ring drilled for the reception of new rivets.

It is an object of this invention, therefore, to provide a bull ring which is secured to the piston head or spider without the use of rivets.

It is another object of this invention to provide a bull ring made in sections which can be readily applied to the piston head or spider and also removed therefrom or replaced with a small expenditure of labor.

It is a further object of the invention to provide a bull ring and method of making and applying the same by the use of which excessive weight of the parts is eliminated. These and other objects and advantages of the invention will be apparent from the following description made in connection with the accompanying drawings, in which like reference characters indicate the same parts throughout the various views, and in which, Fig. 1 is a view showing a portion of the cylinder and a piston head therein in central longitudinal section;

Fig. 2 is an enlarged sectional view of a portion of the piston head or spider and the bull ring;

Fig. 3 is a partial plan view of the ring shown in Fig. 2;

Figs. 4 and 5 are, respectively, a view in side elevation and in plan of a ring having a lap joint;

Figs. 6 and 7 are, respectively, a plan view and a view in side elevation of the portion of a ring showing the joint at the ends of the sections.

Referring to the drawings:

Fig. 1 illustrates the walls of a cylinder and the piston head therein comprising the usual spider member which is mounted upon and carried by the usual piston rod 2. In accordance with the present invention, the member 1 is cast with a circumferential flange 3 which has projecting from the central portion thereof and extending there around a rib 4. The bull ring 5 is made in two semi-cylindrical or semi-annular portions, the ends of which contact at opposite sides of the spider 3. These two portions of the ring are of substantially the cross section, shown in Fig. 2 having a central recess extending around their interior portions which fits over the rib 4 of the spider. The ring is, of course, flush at its side with the sides of the spider 3 and provided at its periphery with the usual packing ring grooves 6 in which are disposed packing rings 7. The ring sections will be assembled on the spider and the ends thereof may be welded together by either the electric arc or the oxyactylene process, or, they can be provided at their ends with lap joints, such as shown in Figs. 4 and 5 and thus be held in place by their position in the cylinder. The abutting ends of the ring can be formed either as shown at 8 in Fig. 3, or, as shown at 9 in Figs. 6 and 7, these joints being separable or welded together. The two semi-circular or semi-cylindrical portions of the ring will, of course, be forced onto the spider 3 and the projecting rib 4 thereof from opposite sides, the parts being turned to provide a snug fit. The ends are welded together or merely provided with suitable lap joints and form a strong and efficient bull ring.

A small rivet 10 can be passed through the lap joint as shown in Figs 3 and 7, and can also project slightly into rib 4, to prevent the ring slipping or rotating around the spider. The head of this rivet will, of course, be countersunk to be flush with the ring surface.

When it is desired to remove the ring of the present invention, the same will merely be struck with a sledge or other heavy hammer and the same broken in pieces. The pieces will readily fall from or can be easily removed from the spider. The spider being made of cast steel will not, of course, be so readily broken as the ring. A new ring can then be placed on the spider in the same manner as the original ring. It will be readily seen that such procedure involves a great deal less labor than the method now in common use of cutting the rivets to release the attached ring. It will be also noted that the ring has its greatest depth of metal beneath the slots for the packing ring where, of course, the greatest thickness of the metal is required.

Another important advantage of this ring is in the reduced amount of metal required in its structure. It is the aim of all modern locomotive designers to eliminate unnecessary and excessive weight from the moving parts. By the elimination of the attaching flanges and the large number of rivets a much reduced weight results from the applicant's structure.

By the elimination of the fastening bolts or rivets for the bull ring, the piston can be designed to approach much closer to the cylinder head and thus necessitate less cylinder clearance and space. This will result in a reduction of size and weight in these parts.

It is thus seen that the applicant has provided a bull ring and a method of making the same which results in great economy of labor and material and furnishes an exceedingly efficient ring.

The projecting rib formed on the flange of the spider might, of course, be formed on the ring sections and fitted into a recess formed on the spider. In some cases, it might also be desirable to use two or more of the ribs 4, arranged in parallel relation, which ribs could then be made of smaller cross-section. The ribs might also be made non-continuous about the spider or ring.

It will, of course, be understood that various changes may be made in the form and detail of the device without departing from the scope of the invention, which generally stated consists in the matter shown and described and set forth in the appended claim.

What is claimed is:

A bull ring for a locomotive piston comprising, a plurality of circumferential sections, said sections being provided on their inner surfaces with a central rectangular recess extending entirely there-around and adapted to engage with a projection on the carrying member for said ring, one end of each section being formed with a central projecting tongue and tongues at each side thereof flush with the sides of the ring and being formed at the other end with two spaced tongues adapted to fit between the tongue on another section whereby the various sections can be joined with overlapping tongues.

In testimony whereof I affix my signature.

WILLIAM J. SCHLACKS.